(12) United States Patent
Wieck

(10) Patent No.: US 7,023,111 B2
(45) Date of Patent: Apr. 4, 2006

(54) ELECTRONIC DEVICE WITH ATTACHMENT AND SWITCHING BETWEEN BATTERIES THEREFOR

(75) Inventor: Christopher Peter Wieck, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 544 days.

(21) Appl. No.: 10/225,409

(22) Filed: Aug. 20, 2002

(65) Prior Publication Data

US 2004/0036358 A1 Feb. 26, 2004

(51) Int. Cl.
*H02J 1/00* (2006.01)
(52) U.S. Cl. .............................. 307/86; 307/29; 307/66
(58) Field of Classification Search ................ 307/38, 307/66, 29, 46, 59, 131, 86, 44, 126, 62; 713/310, 300; 455/127.1
See application file for complete search history.

(56) References Cited

U.S. PATENT DOCUMENTS

| | | | |
|---|---|---|---|
| 3,356,857 A | 12/1967 | Strasen et al. ................. | 307/66 |
| 3,577,003 A | 5/1971 | Behr et al. ..................... | 307/66 |
| 4,044,268 A | 8/1977 | Hammel et al. ............... | 307/66 |
| 4,559,456 A | 12/1985 | Yamamoto et al. ........... | 307/66 |
| 5,272,382 A | 12/1993 | Heald et al. ................... | 307/66 |
| 5,347,163 A | 9/1994 | Yoshimura .................... | 307/66 |
| 5,519,261 A | 5/1996 | Stewart ......................... | 307/87 |
| 5,701,597 A | 12/1997 | Nakanishi et al. ........... | 455/127 |
| 5,717,937 A | 2/1998 | Fritz ....................... | 395/750.01 |
| 5,825,100 A | 10/1998 | Kim ............................. | 307/66 |
| 5,859,481 A | 1/1999 | Banyas ......................... | 307/64 |
| 6,011,323 A * | 1/2000 | Camp .......................... | 307/66 |
| 6,060,789 A | 5/2000 | Yamaguchi ................... | 307/66 |
| 6,199,168 B1 * | 3/2001 | Miller ......................... | 713/310 |
| 6,208,380 B1 * | 3/2001 | Misawa .................... | 348/231.9 |
| 6,298,246 B1 * | 10/2001 | Lysejko et al. ............. | 455/557 |
| 6,357,011 B1 * | 3/2002 | Gilbert ........................ | 713/310 |
| 6,404,168 B1 * | 6/2002 | Shoji ........................... | 307/66 |
| 6,411,062 B1 | 6/2002 | Baranowski et al. ........ | 320/112 |
| 6,424,369 B1 * | 7/2002 | Adair et al. .................. | 348/76 |
| 6,600,657 B1 * | 7/2003 | Yerazunis et al. .......... | 361/737 |
| 6,917,641 B1 * | 7/2005 | Kotzin et al. ............... | 375/130 |
| 2003/0052870 A1 * | 3/2003 | Danielewicz et al. ....... | 345/204 |

OTHER PUBLICATIONS

"Frequently Asked Questions About PC Card Technology", 1996. http://www.pcmcia.org/faq.htm.*

* cited by examiner

*Primary Examiner*—Brian Sircus
*Assistant Examiner*—Andrew Deschere
(74) *Attorney, Agent, or Firm*—John L. Rogitz

(57) ABSTRACT

A host device such as a camera, PDA, etc. can have an attachment such as a wireless modem, with both host and attachment having respective batteries. Some loads in the host are always powered by the host battery, and some loads in the attachment are always powered by the attachment battery, but some other loads in the attachment are selectively powered by either the host or attachment battery depending on a power consumption and/or the relationship between the charges remaining in the batteries.

18 Claims, 1 Drawing Sheet architecture

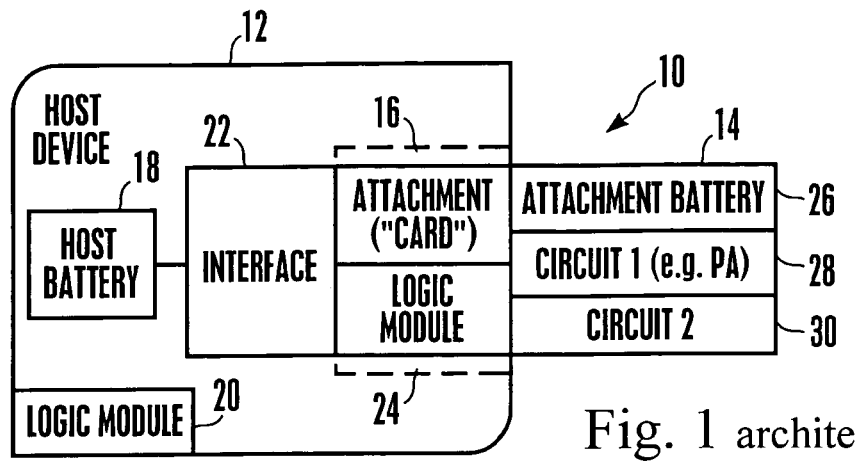
Fig. 1 architecture
Fig. 2 electrical circuit
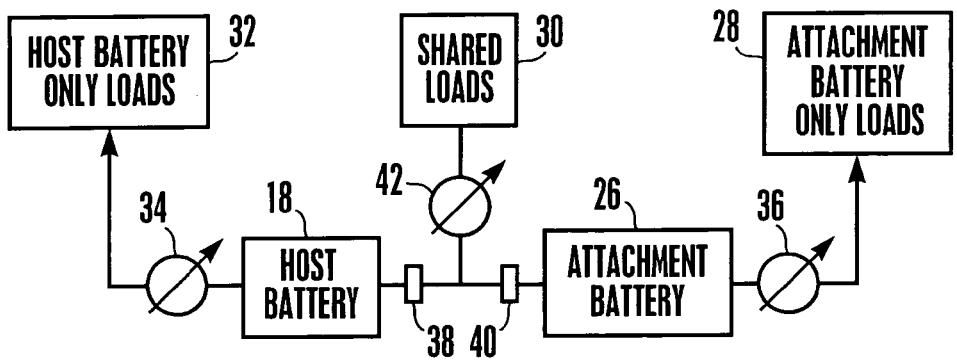
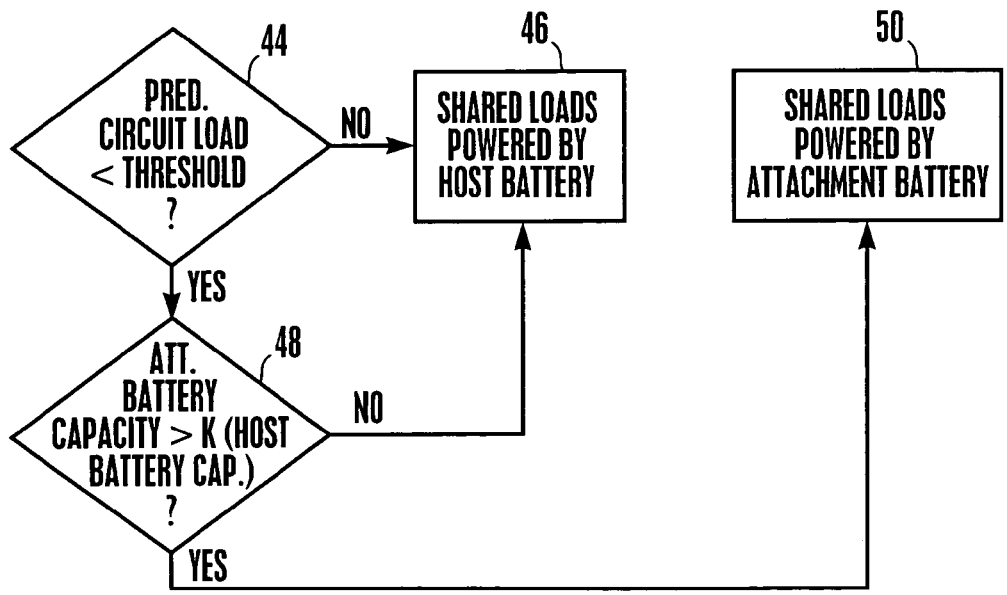
Fig. 3 logic

ELECTRONIC DEVICE WITH ATTACHMENT AND SWITCHING BETWEEN BATTERIES THEREFOR

FIELD OF THE INVENTION

The present invention relates generally to consumer electronic devices with battery-powered attachable options.

BACKGROUND OF THE INVENTION

Many battery-powered consumer electronic devices ("host devices") can include attachable options ("attachments") that themselves can have batteries. An example might be a personal digital assistant (PDA) or camera/camcorder to which can be attached a wireless modem card, for transmitting data to and from the PDA/camera/camcorder. A separate battery on the attachment can be required under some circumstances because design limitations on the amount of current flow through the interface between host and attachment limit the amount of current that can be supplied to the attachment from the host battery.

The present invention understands that for size and cost purposes, it is desirable to minimize the size of the battery particularly on the attachment, with the electrical load of the combined system being shared between the battery in the attachment and the host battery. As an example, a code division multiple access (CDMA) wireless modem card attachment that is designed to meet the Compact Flash Interface specification can require more than 800 mA at peak transmit output power, but the compact flash interface allows the host battery to supply no more than 500 mA across the host-attachment interface. For this reason, a separate battery must be provided on the card, and it can share the power load with the host battery.

The present invention critically observes, however, that it can be difficult to join battery power supplies by simply tying them together. Even though the batteries may be the same type, the voltages can be different based on their relative states of discharge and relative temperatures. Under circumstances of such environmental imbalance, charge from one battery can immediately begin to flow into the other battery, and may flow back across the interface, which might be forbidden by the design specification. On the other hand, if the batteries are separated from each other by, e.g., supplying separate parts of the card from each battery, it may be difficult to find a good division where the peak currents required of both batteries satisfies design limits.

Moreover, different circuits may have different and hard to predict voltage needs. With particular respect to a CDMA card attachment, for example, its power amplifier exhibits a very non-linear, roughly exponential, requirement for current versus output power. Consequently, due to this wide variation of current demand from the CDMA modem, mostly attributable to the power amplifier, it is not possible to predict the amount of current the power amplifier will require relative to the rest of the CDMA modem card at any one time. The result is that a larger than needed attachment battery might be required, with its capacity most of the time going to waste. As understood by the present invention, while it is desirable to minimize the size of the attachment battery, it is also desirable to achieve a balance whereby one battery does not always exhaust itself before the other battery.

The present invention has considered the above-noted problems and has provided the solutions below to one or more of them.

SUMMARY OF THE INVENTION

An electronic system includes a host device, such as but not limited to a PDA or imaging device, that includes host circuitry and a host battery. An attachment, such as but not limited to a wireless modem, is removably engaged with the host device. The attachment includes an attachment battery, a first circuit that is always powered by the attachment battery, and a second circuit that is selectively powered by the host battery or the attachment battery, depending on a power consumption of a designated circuit (e.g., a wireless modem receiver) that is associated with the attachment.

In a preferred embodiment, when the power consumption of the designated circuit is above a threshold, the second circuit is powered by the host battery, otherwise the second circuit is powered by the host battery if a remaining charge capacity of the attachment battery bears a first relationship to a remaining charge capacity of the host battery. On the other hand, the second circuit is powered by the attachment battery if the remaining charge capacity of the attachment battery bears a second relationship to the remaining charge capacity of the host battery. The first and second relationships may depend at least in part on at least one electrical current measurement. A preferred non-limiting way to define the relationships is using the inequality $Cc > Hc(A+C/2)/(B+C/2)$, wherein $Cc$ is the remaining charge capacity of the attachment battery, $Hc$ is the remaining charge capacity of the host battery, $A$ is the current in at least the first circuit, $B$ is the current in at least one circuit that is always powered by the host battery, and $C$ is the current in at least the second circuit.

In another aspect, a method for powering a host electronic device having an attachment includes always powering a host power-only circuit using only a host battery associated with the host electronic device, and always powering an attachment power-only circuit in the attachment using only an attachment battery associated with the attachment. Moreover, based on at least one criterion, the method includes deciding whether to power at least one shared-power circuit associated with the attachment with the host battery or with the attachment battery.

In still another aspect, an electronic system includes a host device including host circuitry and at least one host battery, and an attachment removably engaged with the host device. The attachment includes an attachment battery and a first circuit that is always powered by the attachment battery. The attachment also includes a second circuit that is selectively powered by the host battery or the attachment battery, depending, under some conditions, on a relationship between a remaining charge capacity of the attachment battery and a remaining charge capacity of the host battery.

In another aspect, a processor includes means for determining whether a power consumption of at least one designated circuit associated with an attachment to a host device exceeds a threshold. Means are also provided for determining, if the threshold is not exceeded, a relationship between a remaining charge capacity of an attachment battery associated with the attachment and a remaining charge capacity of a host battery associated with the host device. Switching means are provided for electrically connecting either the attachment battery or the host battery to the second circuit in response to the means for determining.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a simplified block diagram of one embodiment of the present invention;

FIG. 2 is a block diagram of the electrical circuits of the combined host/attachment; and FIG. 3 is a flow chart of the present logic.

DETAILED DESCRIPTION OF THE PREFERRED EMBODIMENT

Referring initially to FIG. 1, a system is shown, generally designated 10, which includes a host device 12 such as but not limited to a personal digital assistant (PDA), or an imaging device such as camcorder, etc. The system 10 also includes an attachment 14 such as but not limited to a wireless modem card, e.g., a CDMA modem card. It is to be understood that a wide range of hosts 12/attachments 14 are contemplated herein, with the attachment 14 preferably being removably engaged by hand with a bay or other socket 16 of the host device 12 by means known in the art.

As shown in FIG. 1, the host device 12 has at least one host battery 18 and a logic module 20 that can be accessed by the processor of the host device 12 to execute the logic discussed below. An interface 22 electrically connects the host device 12 to the attachment 14.

Like the host device 12, the attachment 14 may include a logic module 24 that may be accessed by a processor within the attachment 14 to execute the logic herein in lieu of or in consonance with the host device 12 executing its logic module 20. The logic modules 20, 24 may be embodied in hardware or software, and may be stored on computer readable media.

FIG. 1 shows that the attachment 14 includes at least one attachment battery 26. An exemplary non-limiting attachment battery 26 may be a Lithium-ion type battery rated for 250 milliamp-hours. A first circuit 28 in the attachment 14 is always powered by the attachment battery when the attachment 14 is operating. The first circuit can be, without limitation, a power amplifier in a CDMA modem or other circuit. A second circuit 30, also referred to herein as a shared-power circuit, is contained in the attachment 14 and it is selectively powered either by the host battery 18 (over the interface 22) or attachment battery 26 as more fully disclosed below.

Before explaining the logic by which it is determined whether to power the shared-power circuit 30 using the host battery 18 or attachment battery 26, reference is made to FIG. 2, to gain an understanding of a non-limiting sharing circuitry. As shown, the host battery 18 is used to power host battery-only loads 32 within the host device 12. A current measurement device 34 such as but not limited to a miliOhm type series resistance that may sample current to the loads 32 at, e.g., 0.5 second intervals can be provided to generate a signal representative of the current to the host-only loads 32. The samples may be averaged if desired over the last twenty six (or some other appropriate number of) samples.

In contrast, the attachment battery 26 powers attachment battery-only loads such as the first circuit 28. A current measurement device 36 can be provided to generate a signal representative of the current to the attachment-only loads 28.

FIG. 2 also illustrates that shared loads such as the second circuit 30 shown in FIG. 1 can be powered by either battery 18, 26, depending on whether a host battery switch 38 or attachment battery switch 40 is closed. Which switch is closed is determined by the logic below. A current measuring device 42 can be provided to measure the current that is drawn by the loads 30. It is to be understood that while three current measuring devices are shown, other current measuring configurations may be used in accordance with present principles.

With the above understanding in mind, attention is drawn to the logic flow chart of FIG. 3. While the logic is shown in flow format it is to be understood that in actual implementation software, state machines, and/or other logical mechanisms may be used.

Commencing at decision diamond 44, in one preferred non-limiting embodiment it is determined whether a predetermined circuit load is less than a threshold. As one example, it can be determined whether the total current being supplied from the attachment battery 26 is less than twice the capacity of the battery. As another example, if the attachment is a CDMA modem, at decision diamond 44 it may be determined whether the receiver is operating above or below a particular power level, e.g., −94 dBm.

If the threshold is exceeded, the logic proceeds to block 46, wherein shared loads 30 are powered by the host battery 18 (by, e.g., causing the host battery switch 38 to close and the attachment battery switch 40 to open). In contrast, if the threshold is not exceeded, the logic may move to decision diamond 48 for another test.

At decision diamond 48, the preferred logic contemplates ascertaining the relationship between the remaining capacities of the batteries 18, 26. Specifically, at least one and preferably all three current signals from the current measuring devices 34, 36, 42 shown in FIG. 2 are used to determine which battery should power the shared loads 30. In one exemplary non-limiting embodiment, the determination at decision diamond 48 is undertaken using the following inequality:

$Cc > Hc(A+C/2)/(B+C/2)$, wherein Cc is the remaining charge capacity of the attachment battery, Hc is the remaining charge capacity of the host battery, A is the current sensed by the measuring device 36, B is the current sensed by the measuring device 34, and C is the current sensed by the measuring device 42.

If the inequality does not hold (meaning that the capacity of the attachment battery 26 is relatively lower), the logic moves to block 46 to allow the host battery 18 to power the shared loads 30. Otherwise, if the inequality holds, indicating that the capacity of the attachment battery 26 is relatively high, the logic moves to block 50. At block 50, the attachment battery 26 is used to power the shared loads 30 (by, e.g., causing the host battery switch 38 to open and the attachment battery switch 40 to close).

While the particular ELECTRONIC DEVICE WITH ATTACHMENT AND SWITCHING BETWEEN BATTERIES THEREFOR as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. An electronic system comprising:
   a host device including host circuitry and at least one host battery; and
   an attachment removably engaged with the host device and including an attachment battery, the attachment including at least a first circuit that is always powered by the attachment battery and at least a second circuit that is selectively powered by the host battery or the attachment battery, depending at least in part on a power consumption of at least one designated circuit associated with the attachment, wherein when the power consumption of the designated circuit is above a threshold, the second circuit is powered by the host battery, otherwise the second circuit is powered by the host battery, wherein the determination of which battery powers the second circuit depends at least in part on the inequality $Cc > Hc(A+C/2)/(B+C/2)$, wherein $Cc$ is the remaining charge capacity of the attachment battery, $Hc$ is the remaining charge capacity of the host battery, $A$ is the current in at least the first circuit, $B$ is the current in at least one circuit that is always powered by the host battery, and $C$ is the current in at least the second circuit.

2. The system of claim 1, wherein the designated circuit is a wireless receiver circuit.

3. The system of claim 1, wherein the first and second relationships depend at least in part on at least one electrical current measurement.

4. The system of claim 3, wherein the first and second relationships depend at least in part on at least two electrical current measurements.

5. The system of claim 4, wherein the first and second relationships depend at least in part on at least three electrical current measurements.

6. The system of claim 1, wherein the host device is a personal digital assistant (PDA) and the attachment is a wireless modem.

7. The system of claim 1, wherein the host device is an imaging device and the attachment is a wireless modem.

8. A method for powering a host electronic device having an attachment, comprising:
   at least during operation of the host electronic device, always powering at least a host power-only circuit using only a host battery associated with the host electronic device;
   at least during operation of the attachment, always powering at least an attachment power-only circuit including at least one power amplifier in a CDMA modem in the attachment using only an attachment battery associated with the attachment; and
   based on at least one criterion, deciding whether to power at least one shared-power circuit associated with the attachment with the host battery or with the attachment battery.

9. The method of claim 8, wherein the criterion is at least a power consumption of at least one designated circuit associated with the attachment.

10. The method of claim 9, wherein the designated circuit is a wireless receiver circuit.

11. The method of claim 9, wherein when the power consumption of the designated circuit is above a threshold, the shared-power circuit is powered by the host battery, otherwise the shared-power circuit is powered by the host battery if a remaining charge capacity of the attachment battery bears a first relationship to a remaining charge capacity of the host battery, the shared-power circuit being powered by the attachment battery if the remaining charge capacity of the attachment battery bears a second relationship to the remaining charge capacity of the host battery.

12. The method of claim 11, wherein the first and second relationships depend at least in part on at least one electrical current measurement.

13. The method of claim 12, wherein the first and second relationships are defined at least in part by the inequality $Cc > Hc(A+C/2)/(B+C/2)$, wherein $Cc$ is the remaining charge capacity of the attachment battery, $Hc$ is the remaining charge capacity of the host battery, $A$ is the current in at least the first circuit, $B$ is the current in at least one circuit that is always powered by the host battery, and $C$ is the current in at least the second circuit.

14. The method of claim 8, wherein the host electronic device is a personal digital assistant (PDA) or imaging device and the attachment is a wireless modem.

15. The method of claim 8, wherein the attachment is removably engaged with the host electronic device.

16. An electronic system comprising:
   a host device including host circuitry and at least one host battery; and
   an attachment removably engaged with the host device and including an attachment battery, the attachment including at least a first circuit including at least one power amplifier that is always powered by the attachment battery and at least a second circuit that is selectively powered by the host battery or the attachment battery, depending at least in part at least under some conditions on a relationship between a remaining charge capacity of the attachment battery and a remaining charge capacity of the host battery.

17. The system of claim 16, wherein the relationship is used to determine which battery powers the second circuit only if a power consumption of at least one designated circuit associated with the attachment exceeds a threshold.

18. The system of claim 17, wherein the designated circuit is a wireless receiver circuit, the attachment is a wireless modem, and the host device is a PDA or imaging device.

* * * * *